(12) United States Patent
Agarwal et al.

(10) Patent No.: US 9,239,795 B2
(45) Date of Patent: Jan. 19, 2016

(54) EFFICIENT CACHE MANAGEMENT IN A TILED ARCHITECTURE

(71) Applicant: NVIDIA CORPORATION, Santa Clara, CA (US)

(72) Inventors: Mukesh Chand Agarwal, Bangalore (IN); Narendra Keshav Rane, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/150,394

(22) Filed: Jan. 8, 2014

(65) Prior Publication Data

US 2015/0193903 A1    Jul. 9, 2015

(51) Int. Cl.
- G06F 12/08    (2006.01)
- G06T 1/20    (2006.01)
- G06F 9/38    (2006.01)
- G06F 12/12    (2006.01)
- G06T 1/60    (2006.01)

(52) U.S. Cl.
CPC .......... *G06F 12/0868* (2013.01); *G06F 9/3877* (2013.01); *G06F 12/12* (2013.01); *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 7,805,575 B1 * | 9/2010 | Agarwal et al. | 711/141 |
| 2007/0176939 A1 * | 8/2007 | Sadowski | 345/557 |
| 2009/0083497 A1 * | 3/2009 | Yu et al. | 711/144 |
| 2012/0212489 A1 * | 8/2012 | Fisk | 345/422 |
| 2013/0097386 A1 * | 4/2013 | Lee et al. | 711/128 |
| 2014/0118352 A1 * | 5/2014 | Hakura et al. | 345/426 |
| 2014/0267258 A1 * | 9/2014 | Yang et al. | 345/422 |

* cited by examiner

*Primary Examiner* — Maurice L McDowell, Jr.
(74) *Attorney, Agent, or Firm* — Artegis Law Group, LLP

(57) ABSTRACT

A surface cache stores pixel data on behalf of a pixel processing pipeline that is configured to generate screen tiles. The surface cache assigns hint levels to cache lines storing pixel data according to whether that pixel data is likely to be needed again. When the pixel data is needed to process a subsequent tile, the corresponding cache line is assigned a higher hint value. When the pixel data is not needed again, the corresponding cache line is assigned a lower hint value. The surface cache is configured to preferentially evict cache lines having a lower hint value, thereby preserving cache lines that store pixel data needed for future processing. In addition, a fetch controller is configured to throttle the rate at which fetch requests are issued to the surface cache to prevent situations where pixel data needed for future operations becomes prematurely evicted.

20 Claims, 10 Drawing Sheets

EFFICIENT CACHE MANAGEMENT IN A TILED ARCHITECTURE

BACKGROUND OF THE INVENTION

1. Field of the Invention

Embodiments of the present invention relate generally to caching and, more specifically, to efficient cache management in a tiled architecture.

2. Description of the Related Art

A conventional cache unit typically stores data that is to be processed by a hardware element or collection of hardware elements. Since the cache unit resides physically close to the hardware element(s), memory bandwidth may be improved since memory requests for data already stored in the cache need not be transmitted to global memory. This basic caching technique is ubiquitous throughout most modern computer systems.

In a computer system configured for graphics processing, cache units oftentimes store graphics data to be processed by different types of graphics processing pipelines. For example, a pixel cache unit that is coupled to a pixel processing pipeline could store pixel data to be processed for display on a display screen. In such a case, the pixel cache may improve memory bandwidth because the pixel processing pipeline may need to access the same portion of pixel data multiple different times when rendering an image for display.

In a tiled architecture, the pixel processing pipeline may process pixel data associated with neighboring screen tiles that could potentially overlap with one another, and the pixel cache could store pixel data associated with the overlapping region. With this approach, pixel data associated with an overlapping region shared between first and second screen tiles would only need to be accessed from global memory once (e.g., when the first screen tile is processed), and would be cached for later use when needed again (e.g., when the second screen tile is processed). This approach provides reasonable benefits in simple situations such as that described herein.

However, other situations may arise where the above approach causes significant thrashing of the pixel cache. Returning to the previous example, the pixel data associated with the overlapping region between the first and second screen tiles may also be needed by a tenth screen tile that overlaps the first screen tile. By the time the pixel processing pipeline has processed the third through ninth screen tiles, the pixel data shared between the first and tenth screen tiles may have already been evicted from the pixel cache to create room for pixel data associated with the intervening screen tiles. The pixel processing pipeline would then need to re-request the evicted pixel data from global memory, thereby thrashing the pixel cache to a certain degree. Depending on the size of the screen tiles and the order in which those tiles are processed, such thrashing may have a significant impact on the efficiency of the pixel cache.

Accordingly, what is needed in the art is a more efficient technique for caching pixel data in a tiled architecture.

SUMMARY OF THE INVENTION

One embodiment of the present invention sets forth a subsystem configured to cache data in a tile-based architecture, including a cache unit configured to receive a request for a first portion of data corresponding to a first subregion associated with a screen tile, determine that the first portion of data is not resident in the cache unit, acquire the first portion of data from a memory unit, identify, based on a cache policy, a first cache line in the cache unit that stores a second portion of data corresponding to a second subregion associated with the screen tile, where the cache policy indicates that one or more portions of data corresponding to the second subregion should be evicted before one or more portions of data corresponding to other subregions associated with the screen tile are evicted, evict the second portion of data from the first cache line, and, after evicting, store the first portion of data in the first cache line.

One advantage of the disclosed technique is that cache efficiency is improved because data that is needed again is retained within the cache. Another advantage is that additional data is not fetched until cache lines that are no longer necessary are unlocked, thereby avoiding situations where data needed for future operations is prematurely evicted.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
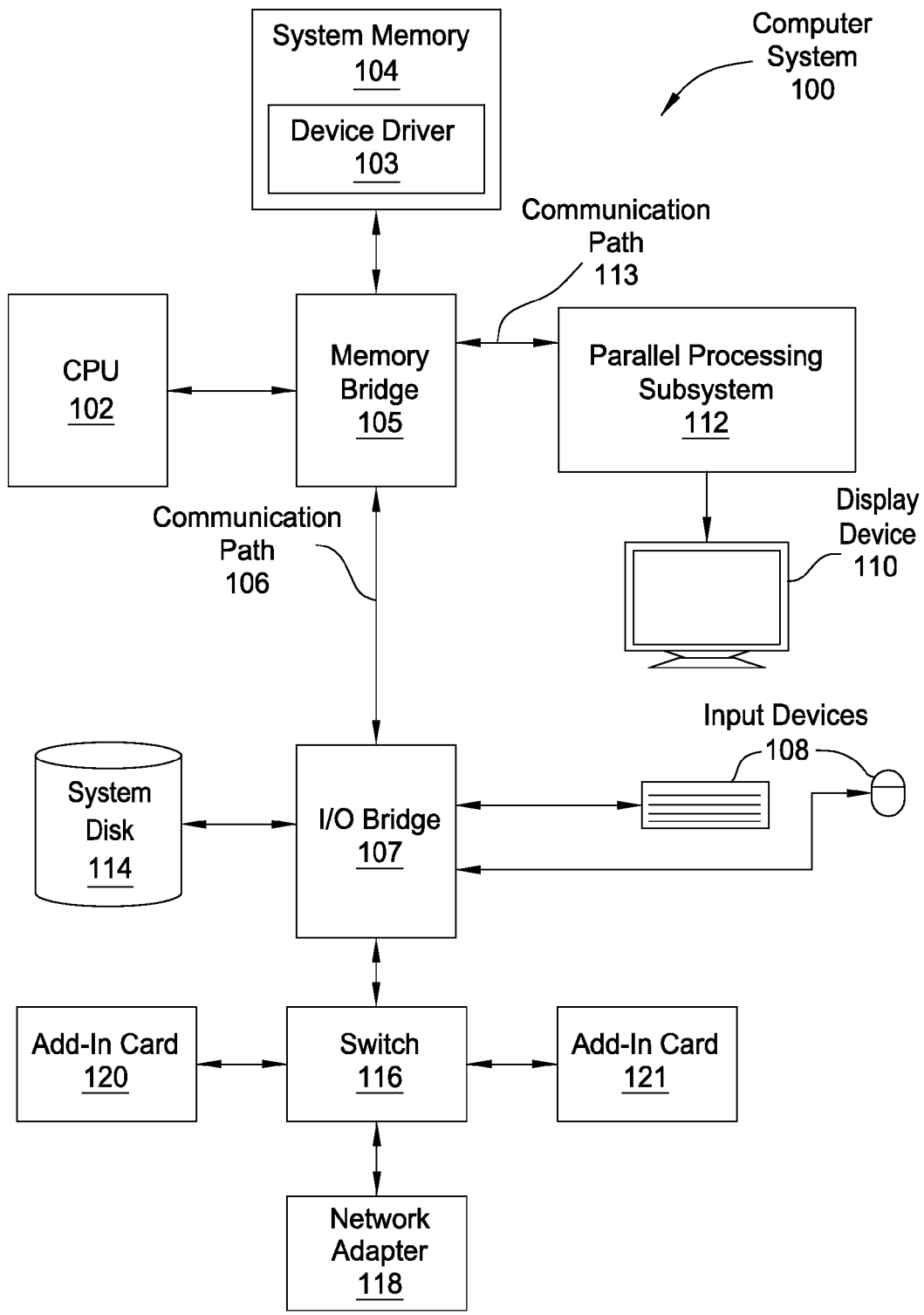
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
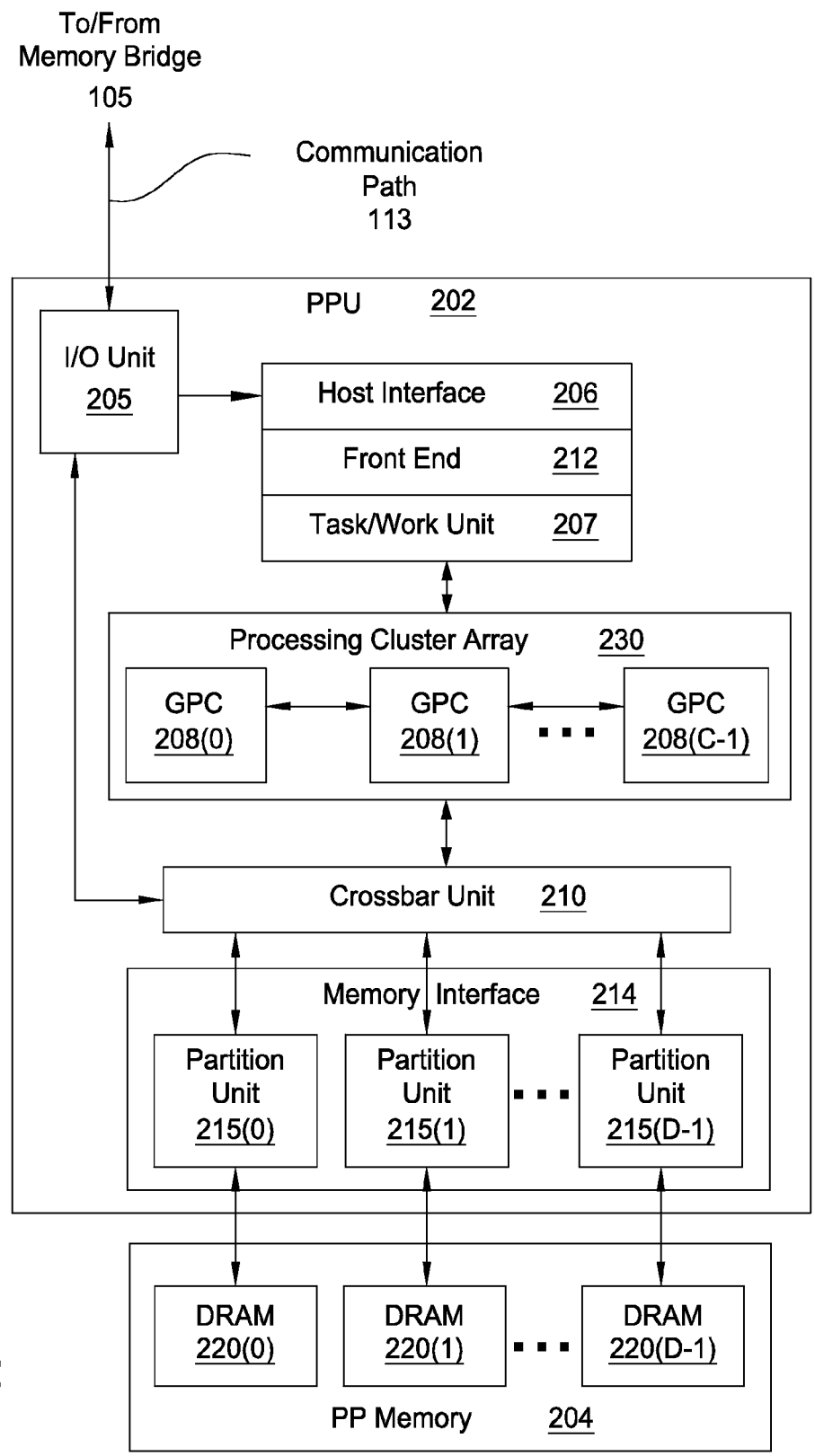
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
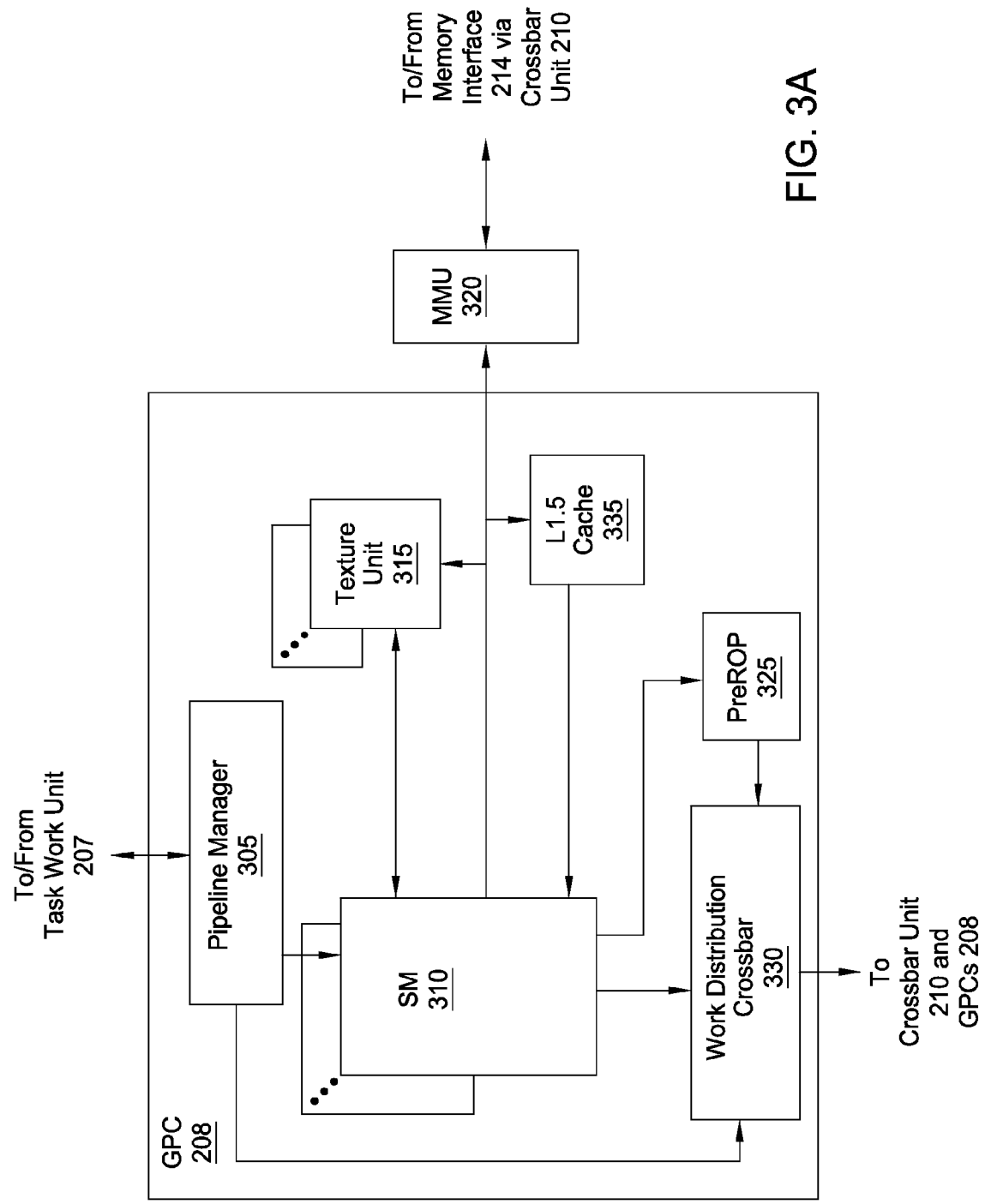
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
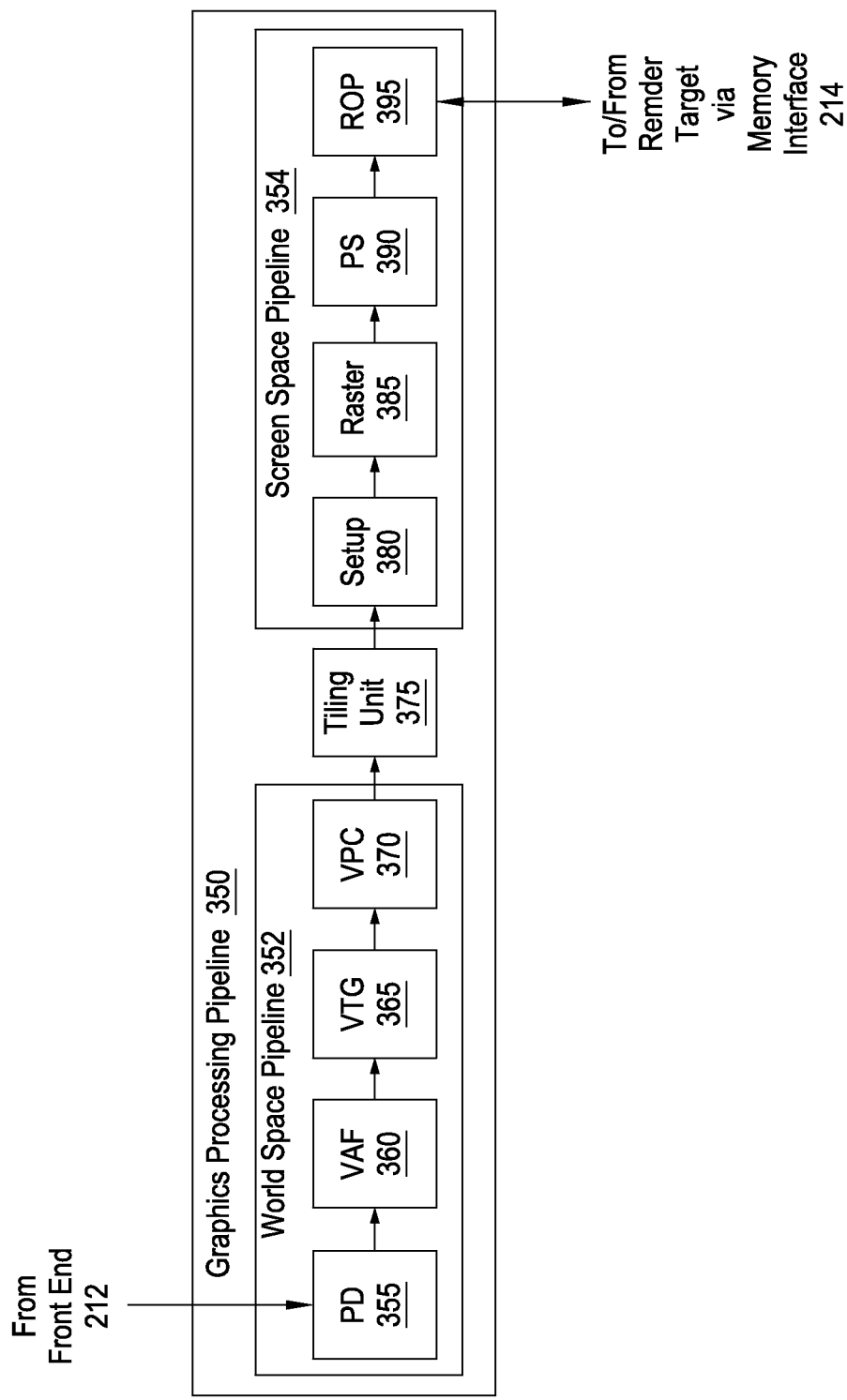
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, the color values, surface normal vectors, and transparency values at each vertex of the graphics primitive. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
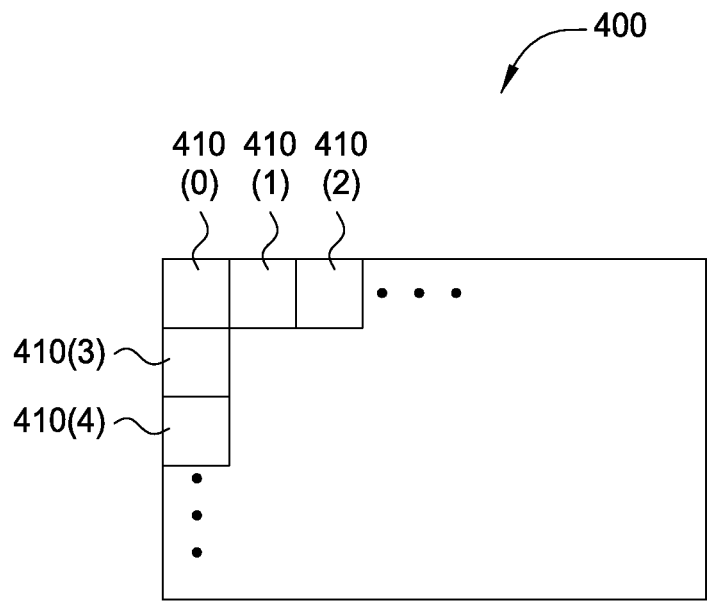
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Efficient Cache Management in a Tiled Architecture

Figure 5:
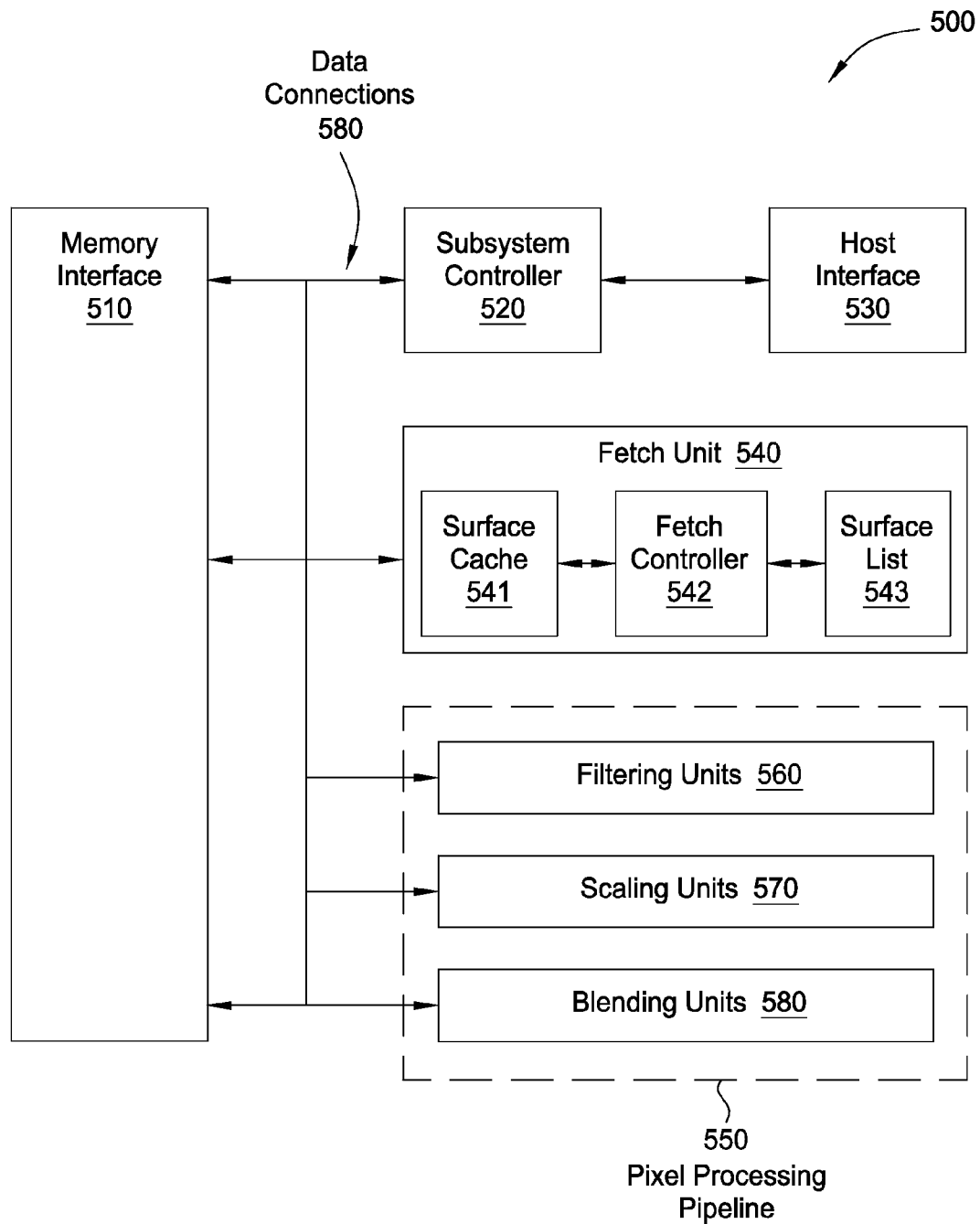
FIG. 5 is a block diagram of a subsystem configured to process pixel data to generate pixels for display, according to one embodiment of the present invention.

FIG. 5 is a block diagram of a subsystem 500 configured to process pixel data to generate pixels for display, according to one embodiment of the present invention. Subsystem 500 may be included within GPC 208 of FIG. 2. In one embodiment, subsystem 500 is configured to implement certain functionality associated with graphics processing pipeline 350 discussed above in conjunction with FIG. 3B, including that of tiling unit 375, as well as other related functionality, as described in greater detail herein.

As shown, subsystem 500 includes a memory interface 510, a subsystem controller 520, a host interface 530, a fetch unit 540, and a pixel processing pipeline 550. Fetch unit 540 includes a surface cache 541, a fetch controller 542, and a surface list 543. Pixel processing pipeline 550 includes filtering units 560, scaling units 570, and blending units 580. Memory interface 510, subsystem controller 520, fetch unit 540, and pixel processing pipeline 550 are coupled together via data connections 580. Subsystem controller 520 and host interface 530 are also coupled to one another.

Memory interface 510 provides access to an external memory (not shown here). The external memory could be a globally accessible memory, a memory surface included in a unified memory architecture, an L2 cache, or another type of memory unit. Subsystem controller 520 is a microcontroller configured to manage the general functionality of subsystem 500 as a whole. Host interface 530 is configured to receive instructions from an external host (not shown) and to forward the instructions to subsystem controller 520 for execution. Those instructions may indicate different pixel-related processing operations to perform with specific portions of pixel data.

Fetch unit 540 is configured to acquire pixel data for processing by pixel processing pipeline 550. Surface cache 541 within fetch unit 540 is configured to cache pixel data on behalf of pixel processing pipeline 550. Fetch controller 542 is configured to issue fetch requests to surface cache 541 to acquire that pixel data. Surface list 543 identifies the pixel data to be fetched and cached. Surface list 543 includes a list of "surfaces" to be processed, where a surface generally refers to a cache tile and associated graphics data that may be processed to generate a screen tile of pixels.

In operation, surface list 543 sequentially steps through cache tiles associated with a given world space frame and then indicates to fetch controller 542 which cache tiles should be acquired to generate a corresponding screen space frame. Fetch controller 542 then issues fetch requests to surface cache 541 for graphics data associated with those cache tiles, and surface cache 541 retrieves the graphics data from external memory, as needed. The graphics data may include portions of geometry and/or graphics primitives, rasterized pixels in need of further processing, and other types of graphics data. Pixel processing pipeline 550 may then access cached pixel data associated with that graphics data for processing.

Pixel processing pipeline 550 includes various processing units that may be configured to process pixel data read from surface cache 541. Filtering units 560 may be configured to perform various filtering operations, including, e.g., temporal noise filtering and cadence detection, among others. Scaling units 570 may be configured to perform various scaling operations, including, e.g., deinterlacing, Y-scaling, and X-scaling, among others. Blending units 580 may be configured to perform various types of blending operations, including color conversions, among others. As a general matter, any of the aforementioned units of pixel processing pipeline 550 may be optionally configured to perform different processing operations depending on the instructions executed by subsystem controller 520.

As mentioned above, fetch unit 540 is configured to acquire graphics data, including pixel data, for processing by pixel processing pipeline 550. In doing so, fetch unit 540 implements various techniques for stepping through cache tiles associated with a world space frame and caching pixel data associated with each such cache tile, as described in greater detail below in conjunction with FIGS. 6A-6B.

Figure 6A:
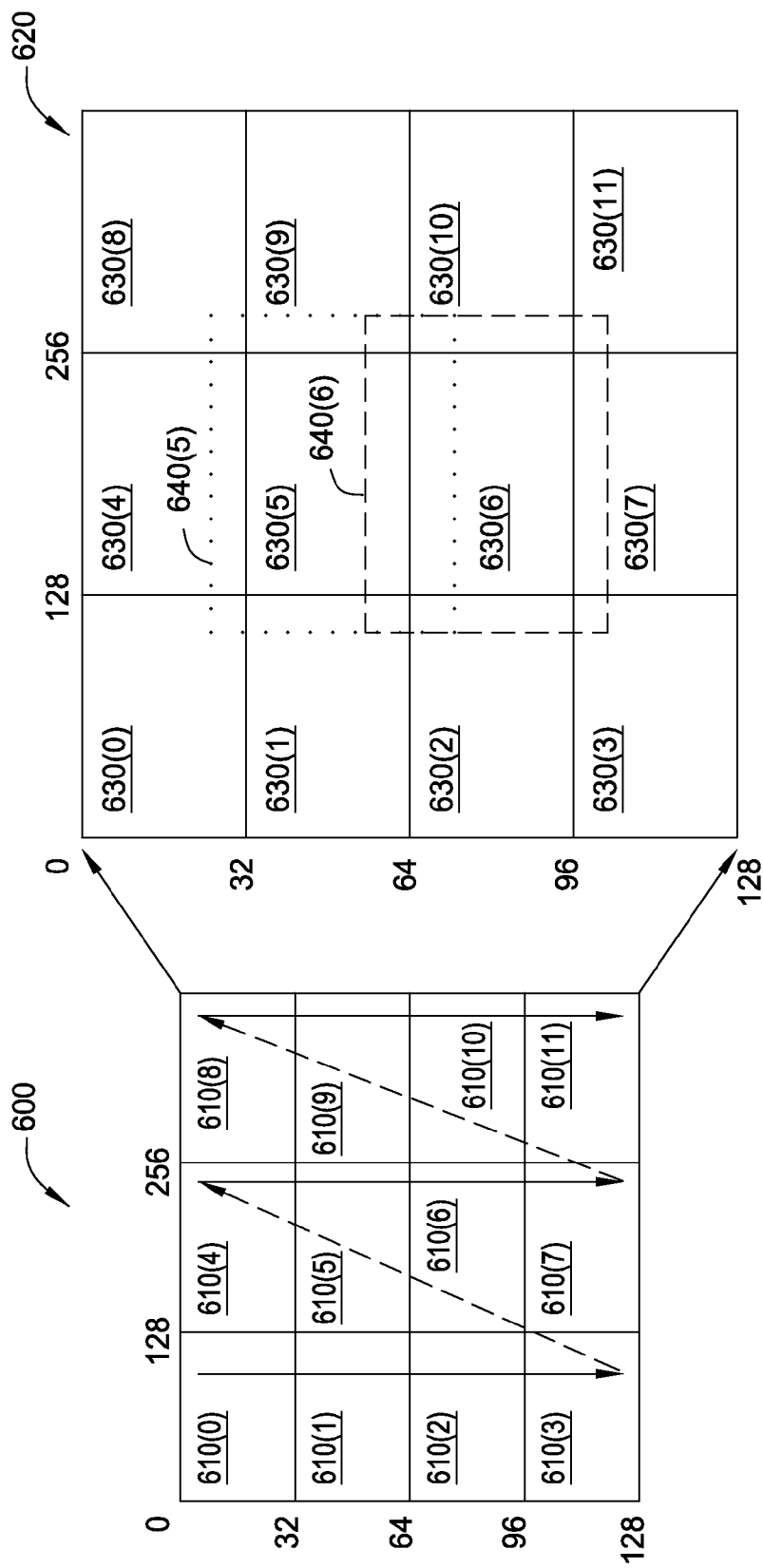
FIG. 6A is a conceptual diagram illustrating a pattern for accessing pixel data associated with a cache tile, according to one embodiment of the present invention.

FIG. 6A is a conceptual diagram illustrating a pattern for accessing pixel data associated with a cache tile, according to one embodiment of the present invention. As shown, a world space frame 600 includes cache tiles 610(0) through 610(11), and a screen space frame 620 includes screen tiles 630(0) through 630(11).

Each cache tile 610 of screen space frame 600 is associated with a different portion of graphics data, including pixel data in need of further processing. Fetch unit 540 is configured to backproject world space frame 600 into screen space frame 620, meaning that fetch unit 540 maps each cache tile 610 of world space frame 600 to a corresponding screen tile 630 of screen space frame 620. In operation, surface list 543 indicates particular cache tiles 610 to acquire for generating corresponding screen tiles 630. Then, fetch controller 542 determines particular cache lines within surface cache 541 where pixel data associated with screen tiles 630 may be stored for later access. Pixel processing pipeline 550 is configured to process each screen tile 630(0) through 630(11) to generate an image for display.

During the backprojection process mentioned above, surface list 543 causes fetch controller 542 to acquire pixel data associated with each cache tile 610 according to a particular sequence that is illustrated within world space frame 600 in FIG. 6A. In that sequence, cache tiles 610 are accessed vertically from top to bottom along each column of cache tiles 610. Those columns are then traversed horizontally from left to right. This sequence is referred to herein as "vertical first." Surface list 543 is configured to step through each cache tile 610 of world space frame 600 according to the vertical first sequence and to indicate to fetch controller 542 specific locations where pixel data associated with each cache tile 610 may be accessed. For each such cache tile 610, fetch controller 542 issues fetch requests to surface cache 541 to acquire portions of pixel data needed to generate the corresponding screen space tile 630. A given portion of the pixel data may already reside within a given cache line of surface cache 541 (a cache hit occurs), or surface cache 541 may need to access the portion of pixel data from external memory (a cache miss occurs). In either case, surface cache 541 eventually stores the needed pixel data.

A given portion of that pixel data may reside within the screen tile 630 itself, and/or within a strip of pixel data associated with a neighboring screen tile 630. For example, in screen space frame 620, region 640(5) includes all portions of pixel data needed to process screen tile 630(5), including strips of pixel data included within neighboring screen tiles 630(0), 630(1), 630(2), 630(4), 630(6), 630(8), 630(9), and 630(10). Similarly, region 640(6) includes all portions of pixel data needed to process screen tile 630(6), including strips of pixel data included within neighboring screen tiles 630(1), 630(2) 630(3), 630(5), 630(7), 630(9), 630(10), and 630(11). A given strip may include any number of columns or rows of pixels and associated data, depending on the particular pixel processing operations for which pixel processing pipeline 550 is configured to perform. For example, if pixel processing pipeline 550 is configured to implement a 5-tap filter, then a given strip would include two rows or columns of pixels associated with a neighboring screen tile 630.

Persons skilled in the art will notice that regions 640(5) and 640(6) overlap one another, indicating that some of the pixel data used for processing screen space tile 630(5) would also be needed for processing screen space tile 630(6).

Surface cache 541 is configured to store portions of pixel data residing in such overlapping regions, allowing that pixel data to be accessed multiple times when different screen tiles are processed.

When surface cache 541 caches portions of pixel data associated with a given screen tile 630, including portions of pixel data associated with neighboring tiles 630, fetch controller 542 assigns each different portion to a particular cache line within surface cache 541. For each such cache line, surface cache 541 assigns a "hint" value that indicates the likelihood that the pixel data stored at a given cache line will be needed when a subsequent screen tile 630 is processed. This caching strategy is described in greater detail below in conjunction with FIG. 6B.

Hint-Based Cache Policy to Reduce Thrashing of Surface Cache

Figure 6B:
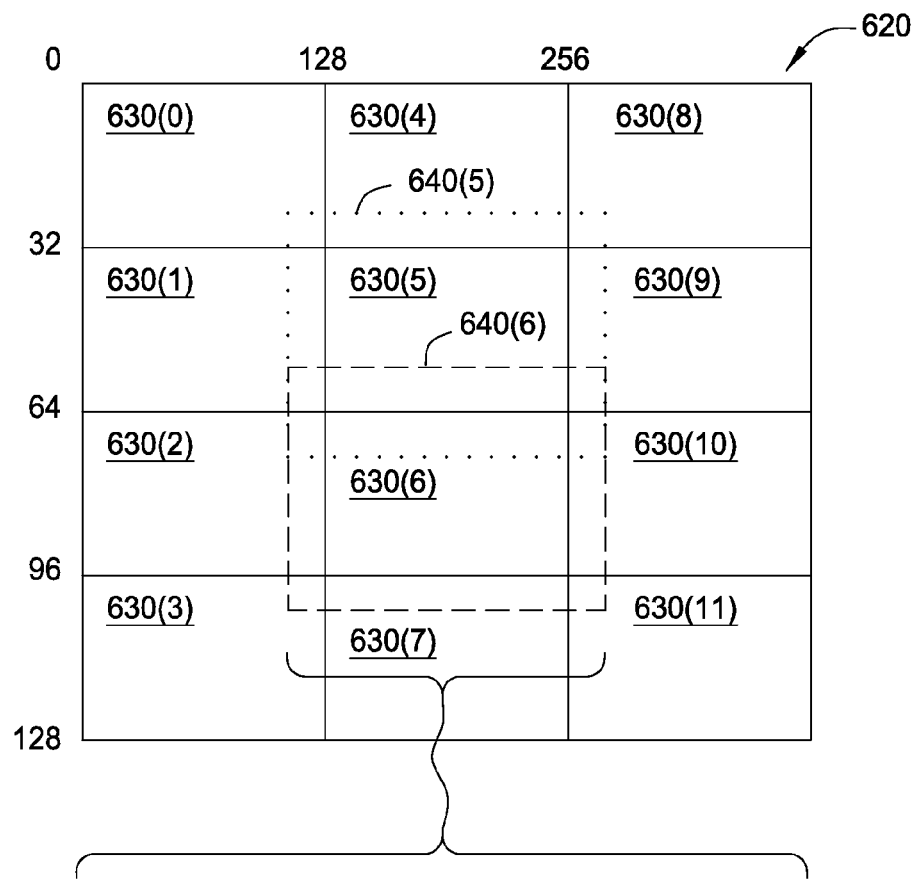
FIG. 6B is a conceptual diagram illustrating a technique for caching pixel data associated with a screen tile, according to one embodiment of the present invention.

FIG. 6B is a conceptual diagram illustrating a technique for caching pixel data associated with a screen tile, according to one embodiment of the present invention. As shown, screen space frame 620 includes screen tiles 630(0) through 630(11), similar to FIG. 6A. Beneath screen space frame 620, screen space tile 630(6) is shown, along with region 640(6). Again, region 640(6) represents a region of pixel data that is needed to process screen space tile 630(6), including pixel data associated with screen space tiles 630 that neighbor screen space tile 630(6).

Fetch controller 542 is configured to assign different portions of region 640(6) to different cache lines 650. Accordingly, each cache line 650 may store a different portion of pixel data used for processing screen tile 630(6). When surface cache 541 stores those cache lines, surface cache 541 assigns a hint value to each such cache line based on the position of that cache line 650 within region 640(6). As mentioned above, the hint value for a given cache line 650 indicates the likelihood that pixel data stored at that cache line will be needed when processing a subsequent screen tile 630.

Due to the vertical first sequence with which fetch controller 542 generates screen tiles 630, particular cache lines 650 are more likely to be needed again than other cache lines. Specifically, cache lines 650 associated with the bottom edge of a region 640 corresponding to a given screen tile 630 are likely to be needed for processing the top edge of another region 640 associated with the subsequent screen tile 630. For example, since cache lines 650 included in a horizontal strip 652 of region 640(6) overlap subsequent screen tile 630(7), those cache lines 650 would be needed again for processing screen tile 630(7) after processing of screen tile 630(6) is complete.

Since fetch controller 542 also traverses columns from left to right, cache lines 650 associated with the right edge of a region 640 corresponding to a given screen tile 630 are likely to be needed for processing the left edge of another region 640 associated with a subsequent screen tile 630. For example, since cache lines 650 included in a vertical strip 651 of region 640(6) overlap subsequent screen tile 630(10), those cache lines 650 would be needed for processing screen tile 630(10) after processing of screen tile 630(6) is complete.

Surface cache 541 is configured to assign higher hint values to cache lines associated with the bottom edge of a region 640 because those cache lines are likely to be needed within a short interval of time (i.e., during the very next screen tile). Surface cache 541 is also configured to assign moderate hint values to cache lines associated with the right-hand edge of a region 640 because those cache lines are likely to be needed within a longer interval of time (i.e., after several intervening screen tiles have been processed). As shown in FIG. 6B, surface cache 541 assigns a hint value of 2 to cache lines 650 within horizontal strip 652 and assigns a hint value of 1 to cache lines 650 within vertical strip 651.

In addition, surface cache 541 assigns a hint value of 0 to cache lines 650 that reside within an interior subregion of region 640 and does not overlap other adjacent regions 640, as is shown. A hint level of zero indicates that the associated cache lines are not likely to be needed for processing subsequent screen tiles 630. As a general matter, surface cache 541 is configured to assign different hint values to different cache lines that store pixel data associated with different subregions of a region 640. Those subregions may include edges or interior subregions of region 640, among other possibilities. In any case, the hint value associated with a cache line falling within a given subregion indicates whether the pixel data stored by the cache line will be needed again, and how soon that pixel data will be needed (if at all). Persons skilled in the art will recognize that the particular hint values discussed herein may be configurable based on the order with which screen tiles are traversed, among other things.

Surface cache 541 relies upon the hint values described above when implementing an eviction policy. Generally, surface cache 541 implements a most recently used (MRU) policy that is modified to reflect that cache lines 650 with lower hint values should be evicted before cache lines 650 with higher hint values. With this approach, surface cache 541 may retain cache lines 650 that are likely to be needed again and evict cache lines 650 that may not be needed again.

At any given point in time, surface cache 541 may include cache lines 650 having various different hint values. Those cache lines 650 may also be locked or unlocked. When a surface cache 541 receives a fetch request from fetch controller 542 for pixel data that is resident within a given cache line 650 (a cache hit occurs), then surface cache 541 locks that cache line 650 to prevent eviction, thereby allowing pixel processing pipeline 550 to safely access the corresponding pixel data. Alternatively, when surface cache 541 receives a fetch request from fetch controller 542 for pixel data that is not resident within any cache line 650 (a cache miss occurs), then surface cache 541 fetches the needed pixel data from external memory. Surface cache 541 caches the fetched pixel data, evicting an occupied cache line as needed. In doing so, surface cache 541 may evict any unlocked cache line according to the modified MRU policy mentioned above and then lock the evicted cache line to store incoming, fetched pixel data. When the pixel data is received, surface cache 541 stores the data in the recently evicted and locked cache line. A given cache line 650 remains locked until pixel processing pipeline 550 has read out all pixel data from the cache line that is needed for processing the current screen tile 630. The caching policy implemented by surface cache 541 is described in stepwise fashion below in conjunction with FIG. 7.

Figure 7:
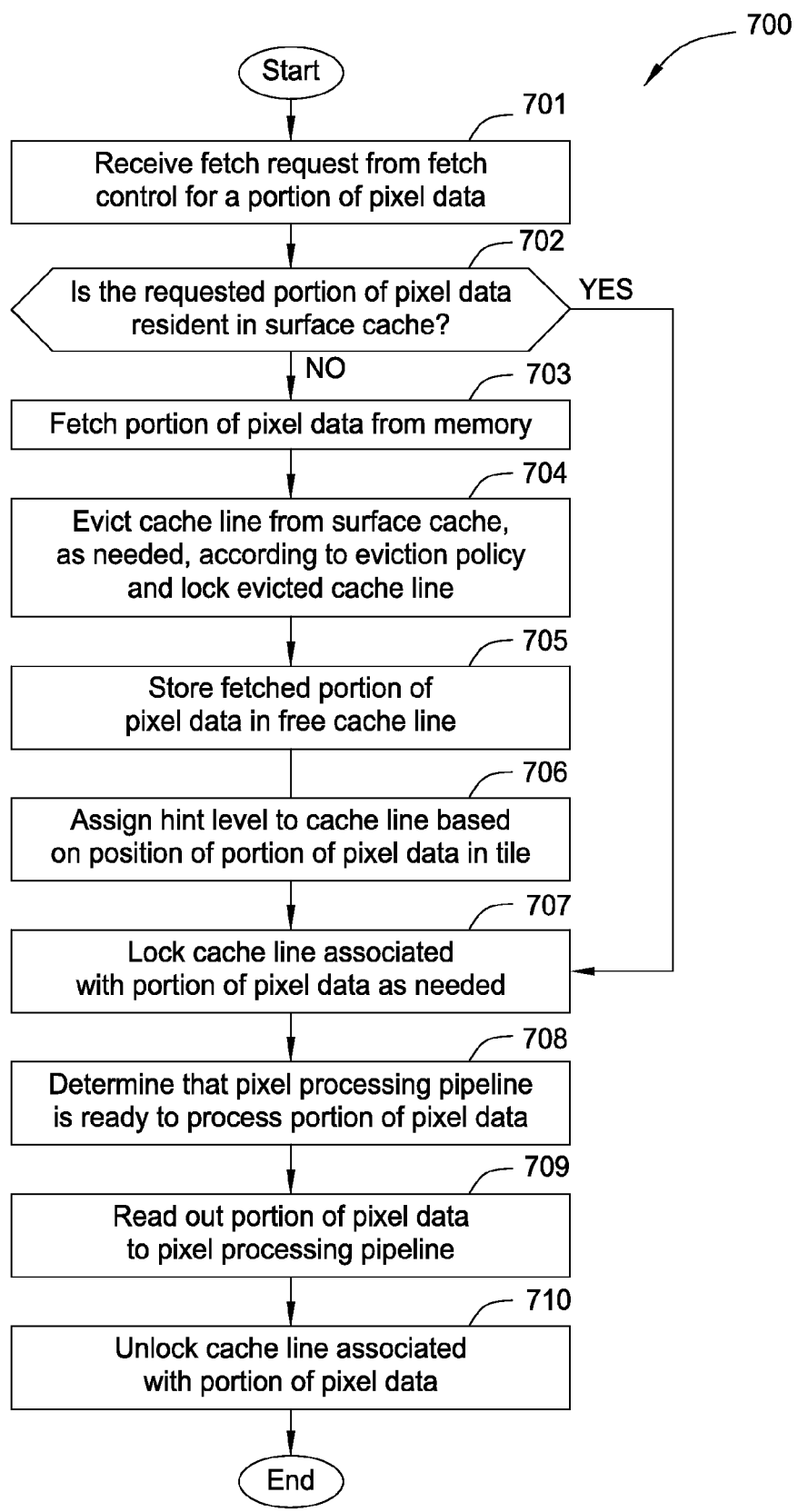
FIG. 7 is a flow diagram of method steps for throttling fetch requests issued to a surface cache, according to one embodiment of the present invention.

FIG. 7 is a flow diagram is method steps for managing pixel data in a surface cache during processing of a tile, according to one embodiment of the present invention. Although the method steps are described in conjunction with the systems of FIGS. 1-5, persons skilled in the art will understand that any system configured to perform the method steps, in any order, is within the scope of the present invention.

As shown, a method 700 begins at step 701, where surface cache 541 receives a fetch request from fetch controller 542 for a portion of pixel data. The portion of pixel data is associated with a screen tile 630 to be processed by pixel processing pipeline 550. At step 702, surface cache 541 determines whether a cache line of surface cache 541 includes the request pixel data. If the requested portion of pixel data is resident, then a cache hit occurs, and surface cache 541 proceeds to step 707, as described in greater detail below.

Otherwise, if surface cache 541 determines at step 702 that the requested portion of pixel data is not resident, then surface cache 541 proceeds to step 703. At step 703, surface cache 541 fetches the requested portion of pixel data from external memory. At step 704, surface cache 542 evicts data from a cache line, according to the modified MRU policy described above, to create space for the fetched data, as needed. In doing so, surface cache 542 locks the recently evicted cache line to reserve that cache line for pixel data to be fetched and sets a valid bit to false. At step 705, surface cache 542 stores the fetched portion of pixel data in the available, locked cache line and sets the valid bit to true, indicating that the cache line now stores valid data. At step 706, surface cache 542 assigns a hint level to the cache line based on the position of the portion of pixel data within the current screen tile. One technique for assigning the hint value is described in detail above in conjunction with FIG. 6B. However, persons skilled in the art will understand that any technique for assigning a hint value to a cache line based on the position of the cache line within a screen tile falls within the scope of the invention.

At step 707, surface cache 542 locks the cache line associated with the portion of pixel data, as needed. Surface cache 542 performs step 707 unless the cache line has already been locked in performing step 704. Locking the cache line in this fashion prevents the cache line from being evicted before the pixel data stored therein can be read out to pixel processing pipeline 550. At step 708, surface cache 541 determines that pixel processing pipeline 550 is ready to process the portion of pixel data. At step 709, surface cache 541 reads out the portion of pixel data to pixel processing pipeline 550. At step 710, surface cache 541 unlocks the cache line, thereby enabling that cache line to be evicted at a later time. The method 700 then ends.

By implementing the hint-based cache policy described herein, surface cache 541 may limit the eviction of cache lines that will be needed again. In particular, cache lines associated with pixel data needed for processing subsequent screen tiles are assigned higher hint values than cache lines associated with portions of pixel values that may not be needed for processing subsequent screen tiles. As such, surface cache 541 may operate with greater efficiency compared to prior art approaches.

Fetch controller 542 may improve the efficiency of surface cache 542 by throttling the issuance of fetch requests under specific circumstances, thereby preventing premature eviction of cache lines having higher hint values, as described in greater detail below.

Throttling Fetch Requests to Prevent Premature Eviction

When acquiring pixel data for a current tile, fetch controller 542 is capable of issuing fetch requests to surface cache 541 to acquire pixel data at a much higher rate than pixel processing pipeline 550 is capable of reading out cached pixel data for processing. In particular, fetch controller 542 is capable of issuing a fetch request for 256 bytes of pixel data every 4 clock cycles, while pixel processing pipeline 550 is only capable of processing several bytes of pixel data per clock cycle. A consequence of this bandwidth mismatch is that surface cache 542 may be forced to evict unlocked cache lines with higher hint values in order to create space for incoming pixel data associated with a fetch request. As mentioned above, cache lines with higher hint values are likely to be needed when subsequent screen tiles are processed. However, if those cache lines are evicted, the pixel data associated with those cache lines would need to be re-fetched, an occurrence commonly known a cache trashing.

To prevent such thrashing, fetch controller 542 is configured to stop issuing fetch requests when surface cache 541 stores sufficient pixel data to supply pixel processing pipeline 550 and does not include any unlocked cache lines with low hint values. In particular, when surface cache 541 includes a threshold number of locked cache lines and zero unlocked cache lines with a hint value of 0, then fetch controller 542 stops issuing fetch requests. With this approach, surface cache 541 is prevented from evicting cache lines with higher hint values when no unlocked cache lines with a hint value of 0 are available for eviction.

Further, when cache 541 includes the threshold number of locked cache lines, pixel processing pipeline 550 still has access to sufficient pixel data for processing. As pixel processing pipeline 550 drains surface cache 541, additional cache lines 650 will become unlocked, and some of those cache lines will have a hint level of zero. Those cache lines may be safely evicted to create space for additional pixel data to be fetched. When a cache line 650 with a hint value of 0 is unlocked, then fetch controller 542 may continue issuing fetch requests. The unlocked hint level 0 cache line may be safely evicted, and pixel data associated with a new fetch request may be stored in the recently evicted cache line. When the number of locked cache lines falls beneath the threshold value, fetch controller 542 may likewise continue issuing fetch requests in order to supply pixel processing pipeline 550 with sufficient pixel data to continue processing the current screen tile.

The threshold number of locked cache lines described above is a configurable value that may be derived from the size and dimension of screen tiles 630, among other factors. In practice, a microcontroller sets the threshold based on various operational parameters, including a scaling ratio, memory latency values, and other parameters. The microcontroller may also adjust the threshold on a per-frame basis depending on the specific tiling configuration associated with each different frame.

By throttling fetch requests in the fashion described herein, fetch controller 542 is capable of reducing thrashing of surface cache 541. Accordingly, surface cache 541 may efficiently implement the modified MRU policy described above in conjunction with FIGS. 6B-7 without being forced to evict cache lines with higher hint values. However, the technique described herein may also be implemented independently of the modified MRU policy. In particular, fetch controller 542 may throttle fetch requests specifically based on the screen position associated with each stored cache line, and may not rely on the hint mechanism described thus far. One technique for throttling fetch requests that may be implemented by fetch controller 542 is described in stepwise fashion below in conjunction with FIG. 8.

Figure 8:
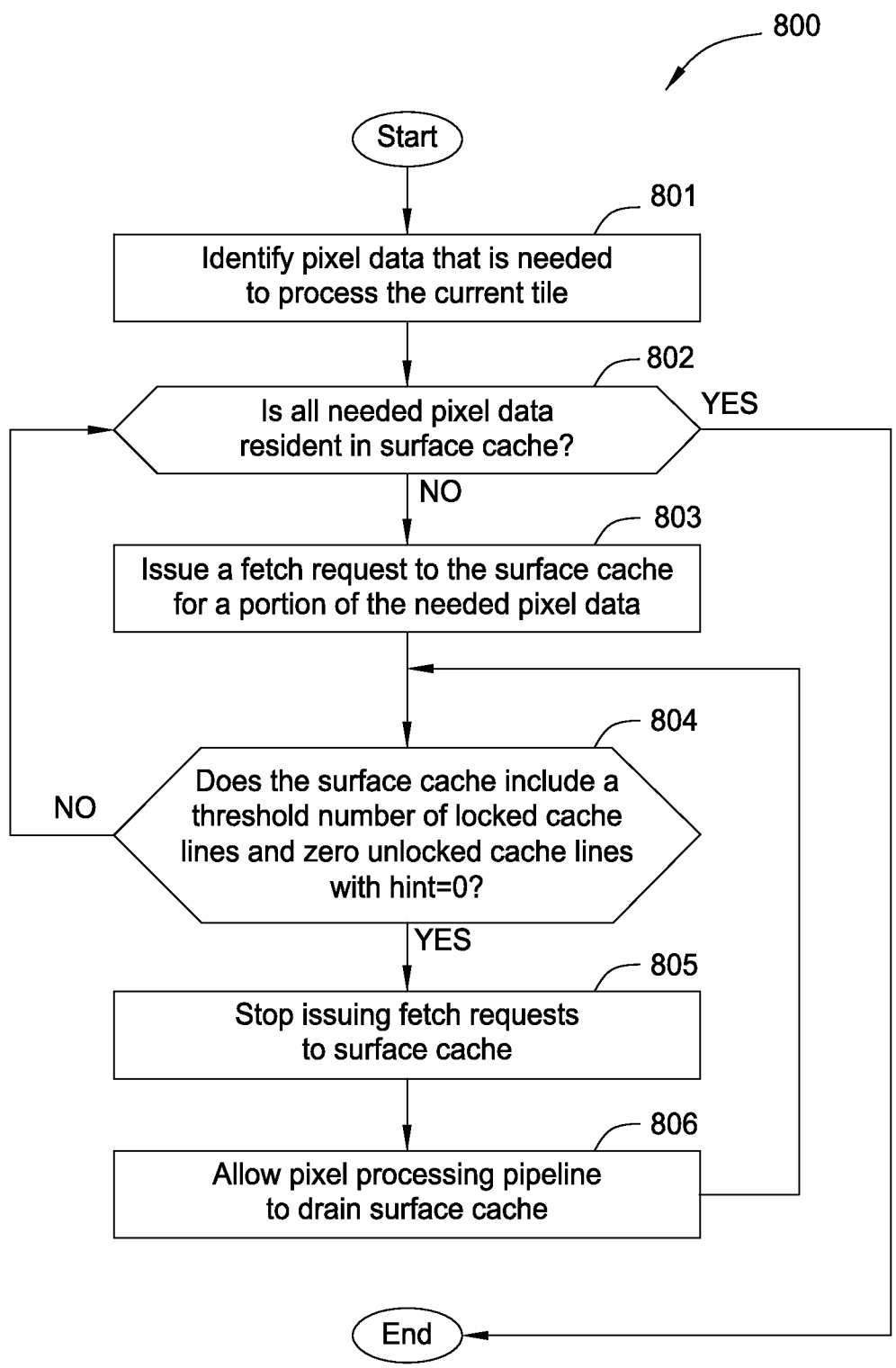
FIG. 8 is a flow diagram is method steps for managing pixel data in a surface cache during processing of a screen tile, according to one embodiment of the present invention.

FIG. 8 is a flow diagram of method steps for throttling fetch requests issued to a surface cache, according to one embodiment of the present invention. Although the method steps are described in conjunction with the systems of FIGS. 1-5, persons skilled in the art will understand that any system configured to perform the method steps, in any order, is within the scope of the present invention.

As shown, a method 800 begins at step 801, where fetch controller 542 identifies pixel data that is needed to process the current tile. Fetch controller 542 may interact with surface list 543 to identify all portions of pixel data needed to generate a screen tile from the current cache tile. At step 802, fetch controller 542 communicates with surface cache 541 to determine whether all needed pixel data is currently resident in that cache. In particular, fetch controller 542 determines, at step 802, whether pixel processing pipeline 550 is capable completing the processing of the current screen tile, in its entirety, with the pixel data that is currently resident within surface cache 541, i.e., without acquiring additional pixel data. If surface cache 541 stores all such needed data, then the method 800 ends.

However, if fetch controller 542 determines at step 802 that additional pixel data is needed, then at step 803, fetch controller 542 issues a fetch request to surface cache 541. Surface cache 541 may respond by implementing the method 700 described above in conjunction with FIG. 7. In doing so, surface cache 541 may process a cache hit or a cache miss and then store the requested pixel data. As also discussed above, surface cache 541 may store pixel data in different cache lines with specific hint values that indicate the likelihood that the stored pixel data will be needed when processing subsequent cache tiles to generate corresponding screen tiles. However, as also noted, surface cache 541 could potentially be forced to evict unlocked cache lines with higher hint values when receiving fetch requests from fetch controller 542 for a large amount of pixel data. Again, this situation may arise because fetch controller 542 is capable of issuing fetch requests for additional pixel data much faster than pixel processing pipeline 550 can drain pixel data from surface cache 541.

To mitigate this issue, at step 804, fetch controller 542 determines whether surface cache 541 includes a threshold number of locked cache lines and zero unlocked cache lines with a hint value of zero. If neither of these conditions are true, then fetch controller 542 returns to step 802 and proceeds as described above. Otherwise, fetch controller 542 proceeds to step 805 and stops issuing fetch requests to surface cache 541, thereby avoiding the eviction of cache lines with higher hint values.

At step 806, fetch controller 542 allows pixel processing pipeline 550 to drain surface cache 541. Since surface cache 541 includes the threshold number of locked cache lines 650, pixel processing pipeline 550 still has access to sufficient pixel data for processing. When draining surface cache 541 at step 806, pixel processing pipeline 550 may read out all pixel data associated with a given cache line having a hint level of zero, and that cache line may then become unlocked and eligible for eviction. Fetch controller returns 542 returns to step 804 after draining pixel data from surface cache 541 and proceeds as described above. Steps 804 through 806 may be repeated until surface cache 541 does not include the threshold number of locked cache lines, indicating that pixel processing pipeline 550 needs additional pixel data that is not resident in surface cache 541. Steps 804 through 806 may also be repeated until certain cache lines with a hint level of zero have become unlocked and therefore eligible for safe eviction.

By implementing the method 800, fetch controller 542 may avoid situations where the bandwidth mismatch between pixel data fetch rate and pixel data drain rate results in premature evictions from surface cache 541, thereby enhancing the efficiency of surface cache 541.

Figure 6B:
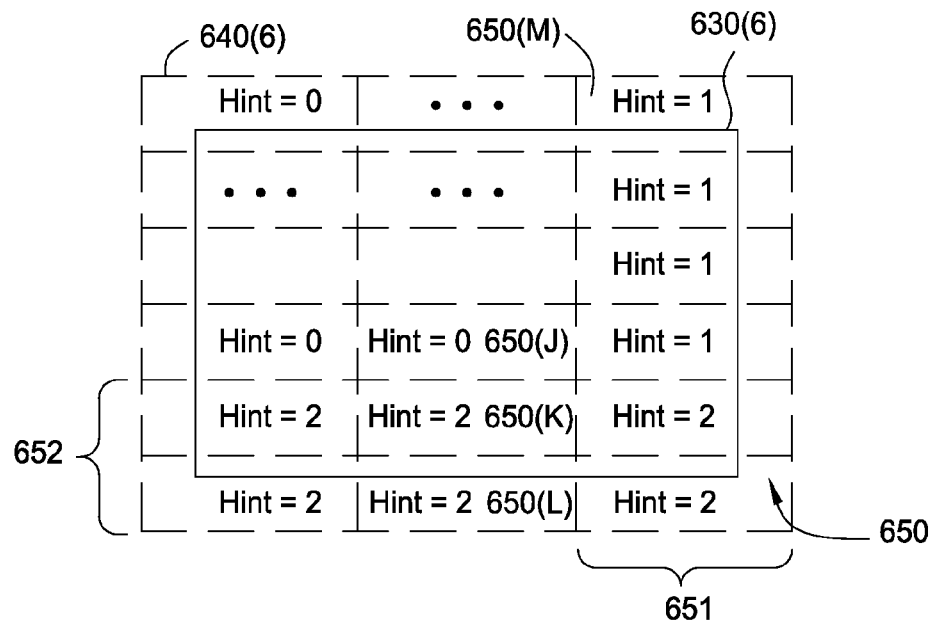

Referring generally to FIGS. 5-8, persons skilled in the art will recognize that the hint-based cache policy described in conjunction with FIGS. 6A-7 and the fetch request throttling technique described in conjunction with FIG. 8 may be implemented by subsystem 500 of FIG. 5 in conjunction with one another. However, those skilled in the art will also understand that either approach may be implemented separately and independently of one another.

For example, surface cache 541 could implement the hint-based caching policy without the benefit of fetch controller 542 throttling fetch requests. Likewise, fetch controller 542 could throttle fetch requests based on other criteria aside from that discussed in conjunction with step 804. Generally, fetch controller 542 need only determine that surface cache 541 stores sufficient data for pixel processing pipeline 550 and that issuing additional fetch requests would cause premature eviction of pixel data needed for later processing. Fetch controller 541 could, in practice, make such a determination regardless of whether surface cache 541 implements the hint-based policy described herein.

In sum, a surface cache stores pixel data on behalf of a pixel processing pipeline configured to process the pixel data to generate screen tiles. The surface cache assigns hint levels to cache lines storing portions of pixel data according to whether those portions of pixel data are likely to be needed again. When a portion of pixel data is associated with certain edges of a current screen tile, that portion may be needed to process a subsequent tile and is therefore assigned a higher hint value. When the portion of pixel data is associated with a central area of the current tile, that portion may not be needed again and is assigned a lower hint value. The surface cache is configured to preferentially evict cache lines having a lower hint value, thereby preserving cache lines that may be needed again and improving cache efficiency. In addition, a fetch controller is configured to throttle the rate at which fetch requests are issued to the surface cache in order to prevent situations where pixel data that is likely to be needed again becomes prematurely evicted, further improving cache efficiency.

One advantage of the techniques disclosed herein is that surface cache efficiency is improved because pixel data that will be needed again is retained within the cache. Another advantage is that additional pixel data are not fetched until cache lines that are no longer necessary are unlocked, thereby avoiding situations where pixel data needed for future operations is prematurely evicted.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A subsystem configured to cache data in a tile-based architecture, comprising:
   a fetch controller configured to issue requests for portions of data; and
   a cache unit coupled to the fetch controller and configured to:
      receive a request for a first portion of data corresponding to a first subregion associated with a screen tile from the fetch controller,
      determine that the first portion of data is not resident in the cache unit,
      acquire the first portion of data from a memory unit,
      identify, based on a cache policy, a first cache line in the cache unit that stores a second portion of data corresponding to a second subregion associated with the screen tile, wherein the cache policy indicates that one or more portions of data corresponding to the second subregion should be evicted before one or more portions of data corresponding to other subregions associated with the screen tile are evicted,
      evict the second portion of data from the first cache line, and
      after evicting, store the first portion of data in the first cache line.

2. The subsystem of claim 1, wherein the cache unit is configured to store the first portion of data in the first cache line by assigning a first value to the first cache line that exceeds a second value previously assigned to the first cache line when the first cache line stored the second portion of data.

3. The subsystem of claim 2, wherein the first value is associated with the first subregion, and the second value is associated with the second subregion, and the cache unit is further configured to:
   assign the first value to one or more cache lines in the cache unit that store portions of data corresponding to the first subregion; and
   assign the second value to one or more cache lines in the cache unit that store portions of data corresponding to the second subregion.

4. The subsystem of claim 1, wherein the first subregion comprises an edge subregion associated with the screen tile, and the second subregion comprises an interior subregion associated with the screen tile.

5. The subsystem of claim 1, wherein the first subregion comprises a vertical edge subregion associated with the screen tile, and the second subregion comprises a horizontal edge subregion associated with the screen tile.

6. The subsystem of claim 1, wherein the cache unit is further configured to:
   lock the first cache line to prevent data stored in the first cache line from being evicted;
   read the first portion of data from the first cache line to transmit the first portion of data to a processing pipeline; and
   unlock the first cache line for the data stored in the first cache line to be evicted.

7. The subsystem of claim 6, wherein the cache unit is further configured to:
   receive another request to access the first portion of data from the first cache line; and
   lock the first cache line to prevent the data stored in the first cache line from being evicted.

8. The subsystem of claim 1, wherein the first subregion and the second subregion reside within a region of a frame that includes pixel data associated with the screen tile and pixel data associated with other screen tiles residing adjacent to the screen tile in the frame.

9. A computer-implemented method for caching data in a tile-based architecture, the method comprising:
   receiving a request for a first portion of data corresponding to a first region associated with a screen tile;
   determining that the first portion of data is not resident in a cache memory;
   acquiring the first portion of data from another memory;
   identifying, a first cache line in the cache memory that stores a second portion of data corresponding to a second region associated with the screen tile;
   determining that the second portion of data should be evicted from the first cache line;
   evicting the second portion of data from the first cache line; and
   after evicting, storing the first portion of data in the first cache line.

10. The computer-implemented method of claim 9, wherein storing the first portion of data in the first cache line further comprises assigning a first value to the first cache line that exceeds a second value previously assigned to the first cache line when the first cache line stored the second portion of data.

11. The computer-implemented method of claim 10, wherein the first value is associated with the first region, and the second value is associated with the second region, and further comprising:
   assigning the first value to one or more cache lines in the cache memory that store portions of data corresponding to the first region; and
   assigning the second value to one or more cache lines in the cache memory that store portions of data corresponding to the second region.

12. The computer-implemented method of claim 9, wherein the first region comprises an edge region associated with the screen tile, and the second region comprises an interior region associated with the screen tile.

13. The computer-implemented method of claim 9, wherein the first region comprises a vertical edge region associated with the screen tile, and the second region comprises a horizontal edge region associated with the screen tile.

14. The computer-implemented method of claim 9, further comprising:
   locking the first cache line to prevent data stored in the first cache line from being evicted;
   reading the first portion of data from the first cache line to transmit the first portion of data to a processing pipeline; and
   unlocking the first cache line the data stored in the first cache line to be evicted.

15. The computer-implemented method of claim 14, further comprising:
   receiving another request to access the first portion of data from the first cache line; and
   locking the first cache line to prevent the data stored in the first cache line from being evicted.

16. The computer-implemented method of claim 9, wherein the first region and the second region are associated with pixel data related to the screen tile and pixel data related to other screen tiles residing adjacent to the screen tile in a frame.

17. A computing device configured to cache data in a tile-based architecture, comprising:
   a first memory;
   a fetch controller configured to issue requests for portions of data; and
   a cache memory coupled to the first memory unit and to the fetch controller and configured to:
      receive a request for a first portion of data corresponding to a first region associated with a screen tile from the fetch controller,
      determine that the first portion of data is not resident in the cache memory,
      acquire the first portion of data from the first memory,
      identify a first cache line that stores a second portion of data corresponding to a second region associated with the screen tile;
      determining that the second portion of data should be evicted from the first cache line;
      evict the second portion of data from the first cache line, and
      after evicting, store the first portion of data in the first cache line.

18. The computing device of claim 17, wherein the cache memory is configured to store the first portion of data in the first cache line by assigning a first value to the first cache line that exceeds a second value previously assigned to the first cache line when the first cache line stored the second portion of data.

19. The computing device of claim 18, wherein the first value is associated with the first region, and the second value is associated with the second region, and the cache memory is further configured to:
   assign the first value to one or more cache lines that store portions of data corresponding to the first region; and
   assign the second value to one or more cache lines that store portions of data corresponding to the second region.

20. The computing device of claim 17, wherein the first region comprises an edge region associated with the screen tile, and the second region comprises an interior region associated with the screen tile.

* * * * *